US006369999B1

(12) United States Patent
Wohlgemuth et al.

(10) Patent No.: US 6,369,999 B1
(45) Date of Patent: Apr. 9, 2002

(54) PORTABLE SURGE PROTECTOR

(75) Inventors: Rainer Joseph Wohlgemuth, Palatine; James W. Beile, Arlington Heights; Howard Danzyger, Aurora, all of IL (US); James Weisburn, Massillon, OH (US); Michael J. Pelland, Medinah; John Olson, Chicago, both of IL (US)

(73) Assignee: Fellowes Manufacturing Company, Itasca, IL (US)

( * ) Notice: Subject to any disclaimer, the term of this patent is extended or adjusted under 35 U.S.C. 154(b) by 0 days.

(21) Appl. No.: 09/540,151

(22) Filed: Mar. 31, 2000

(51) Int. Cl.[7] .................................................. H02H 3/22

(52) U.S. Cl. ....................... 361/111; 361/118; 439/131; 439/142; 439/501

(58) Field of Search ............................. 361/1, 111, 119, 361/118; 439/4, 131, 142, 501, 505

(56) References Cited

U.S. PATENT DOCUMENTS

| | | | | |
|---|---|---|---|---|
| 3,622,684 | A | 11/1971 | Press | 174/48 |
| 4,282,954 | A | 8/1981 | Hill | 191/12.4 |
| 4,395,640 | A | 7/1983 | Bone | 307/115 |
| 4,940,859 | A | 7/1990 | Peterson | 191/12.4 |
| 5,157,273 | A | 10/1992 | Medendorp et al. | 307/147 |
| 5,234,360 | A | 8/1993 | Kramer, Jr. | 439/505 |
| 5,236,371 | A | 8/1993 | Matthis | 439/501 |
| 5,236,374 | A | 8/1993 | Leonard et al. | 439/505 |
| 5,241,593 | A | 8/1993 | Wagner | 379/438 |
| 5,439,390 | A | 8/1995 | Raynor et al. | 439/502 |
| D362,229 | S | 9/1995 | Moses | D13/142 |
| 5,466,165 | A | 11/1995 | Boesel et al. | 439/142 |
| 5,481,607 | A | 1/1996 | Hsiao | 379/438 |
| 5,547,393 | A | 8/1996 | Jansen | 439/501 |
| 5,562,488 | A | 10/1996 | Neiser et al. | 439/501 |
| 5,628,641 | A | 5/1997 | Hahn | 439/13 |
| 5,629,826 | A | 5/1997 | Roca et al. | 361/118 |
| 5,692,914 | A | 12/1997 | Mitani et al. | 439/131 |
| 5,700,150 | A | 12/1997 | Morin | 439/4 |
| 5,755,582 | A | 5/1998 | Charlton | 439/131 |
| 5,902,148 | A | 5/1999 | O'Rourke | 439/505 |
| 5,931,702 | A | 8/1999 | Fladung | 439/652 |
| 5,957,701 | A | 9/1999 | McMillin | 439/13 |
| 5,966,282 | A | 10/1999 | Ryan et al. | 361/118 |
| 5,973,902 | A | 10/1999 | King | 361/111 |

*Primary Examiner*—Ronald W. Leja
(74) *Attorney, Agent, or Firm*—Brinks Hofer Gilson & Lione

(57) ABSTRACT

The present invention relates to a portable surge protector providing both power line and data line surge protection. The surge protector has a housing with a central opening, and an internal cavity surrounding the central opening with a peripheral opening to receive a cord. By rotation of a mounting reel, the cord moves between a nonuse, coiled position within the housing to a use extended position outside of the housing. An electrical connector is pivotally supported in the central opening housing and has at least one electrical socket and a set of electrical prongs that extend rearwardly from the socket. The connector can be rotated to a first position normal to the housing, in which the prongs and the socket are exposed for use, or to a second position parallel to the housing, in which the socket and the prongs are recessed in the central opening.

18 Claims, 3 Drawing Sheets

Fig. 6
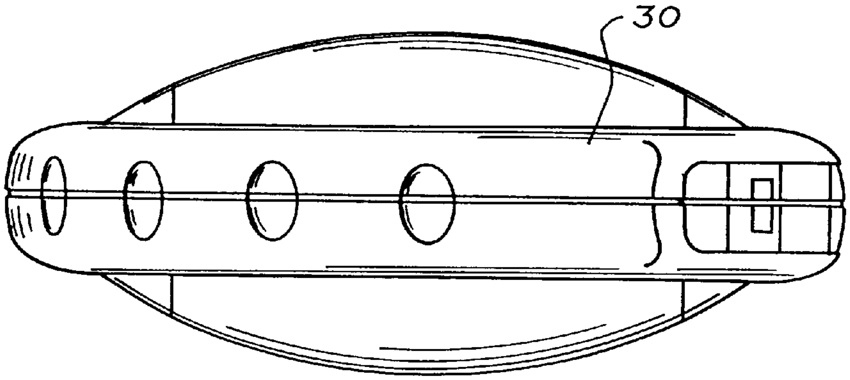
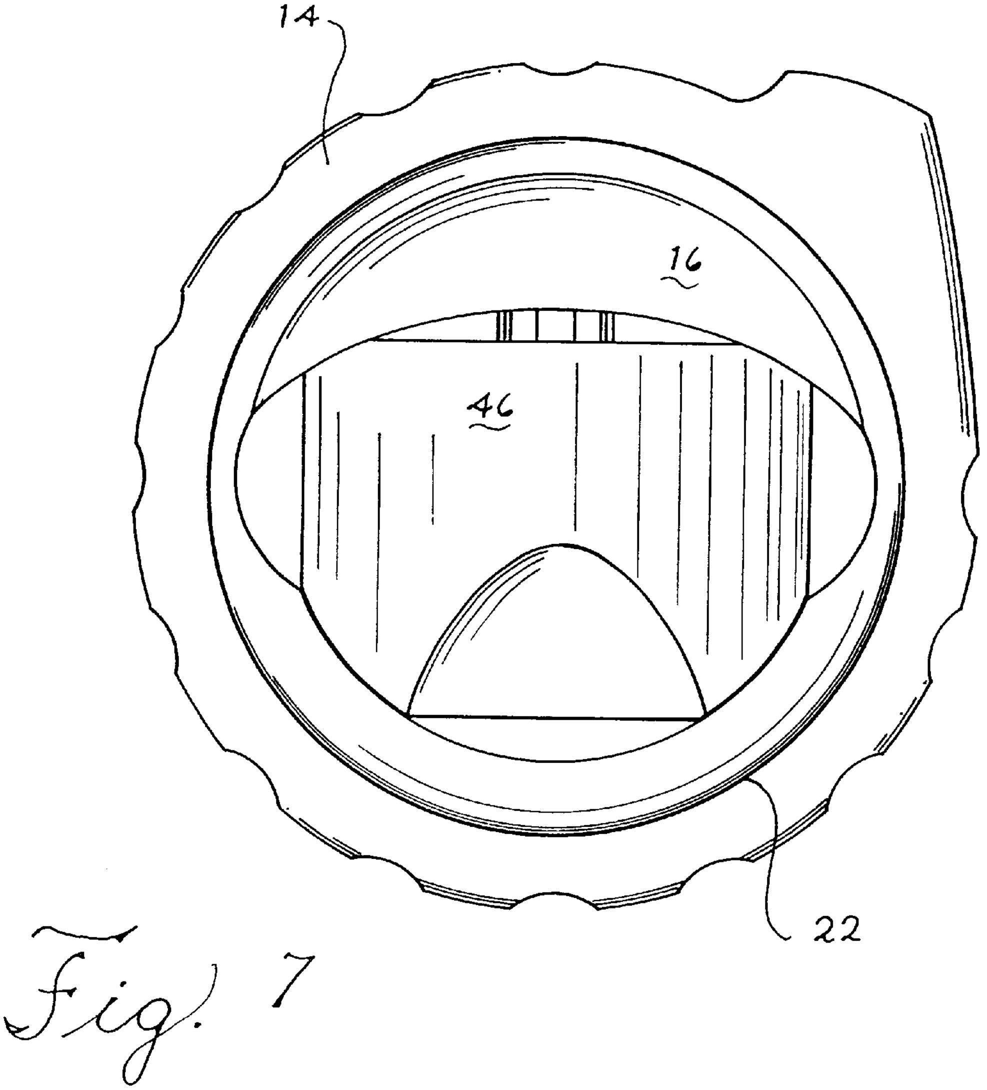
Fig. 7

PORTABLE SURGE PROTECTOR

BACKGROUND OF THE INVENTION

The present invention relates generally to electrical surge protectors for electrical devices and/or connections, such as power supply cords and incoming telephone or data lines, and particularly to surge protectors that are compact and easy to transport.

A surge protector is a device placed in an electrical circuit to protect electrical equipment from dangerous surges and voltage spikes that could damage the equipment if permitted to pass through the surge protector without interruption. Many home computers and laptop computers do not include adequate built-in surge protection. In the absence of surge protection, power line surges and transient voltage spikes can cause data errors and permanent damage to the computer equipment. For example, with respect to the electrical power supplies, it has been known that power surges and transient voltage spikes, can seriously affect the operation of computer circuitry causing serious memory loss, mechanical damage, and the like. It is therefore well known to provide power strips or adaptors that incorporate circuits for suppressing power line surges and transient spikes through electrical or communications lines.

Conventional power strips having surge protection typically consist of a rectangular housing with multiple electrical sockets and a power cord connected to one end of the housing and ending with an electrical plug for insertion into a wall or floor electrical socket. In other embodiments, the electrical plug is mounted directly on the housing, thereby eliminating the need for the power cord. These conventional power strips having surge suppression capability are typically bulky and heavy. The size of these devices and the presence of the cord make these devices cumbersome and difficult to transport.

Further, electrical sockets and signal cord power sources may often be in different locations requiring the use of separate surge protection devices or multiple extension cords. Surge protection devices are often used in situations requiring both electrical and data lines; for example, while using a computer to access various on-line services. In these situations, multiple and separate cords are required for the electrical and data line connections.

Due to the advent of portable computers, it is desirable to provide a surge protection device that is easy to transport. The large size of conventional surge protectors and the inclusion of power cords make these surge protectors unwieldy and difficult to transport. As such, it is desirable to provide a surge protection device that is compact, easy to pack and transport, and that provides surge protection for both electrical and telecommunications lines. It is especially desirable to provide a portable surge suppression device that is easy to transport and does not have or require multiple external electrical or data line cords.

In portable surge protection devices that have the electrical plug mounted directly on the housing, the electrical plug protrudes from the housing and is exposed when not in use. The exposed electrical plug may scratch or otherwise damage other items being carried with the surge protection device. In addition, one or more of the of the electrical prongs can become bent. In some instances, a plastic cover is provided for the electrical prong, but this is a separate component that is easily dislodged and may be misplaced or lost altogether. Yet other devices provide a hinged cover for the electrical plug. This too, although attached to the housing, is a distinct component that, in transport, may become dislodged from the electrical plug or broken away.

Accordingly, it is an object of the present invention to provide a small and compact electrical surge protection device that is easy to transport.

A further object of the present invention is provide a portable surge suppression device wherein the electrical prongs of the electrical plug are protected when not in use.

It is yet another object of the present invention to provide a compact portable surge protector that provides both power line and data line surge protection.

It is a further object of the present invention to provide a portable surge protector having an electrical plug that plugs directly into a floor or wall unit.

It is another object of the present invention to provide a compact portable surge protection device having a data line that can be retracted into the housing of the device when not in use.

BRIEF SUMMARY OF THE INVENTION

The present invention relates to a portable surge protector providing both power line and data line surge protection. The surge protector has a housing with a central opening, and an internal cavity surrounding the central opening with a peripheral opening to receive a cord. By rotation of a mounting reel, the cord moves between a nonuse, coiled position within the housing to a use, extended position outside of the housing. An electrical connector is pivotally supported in the central opening housing and has at least one electrical socket and a set of electrical prongs that extend rearwardly from the socket. The connector can be rotated to a first position normal to the housing, in which the prongs and the socket are exposed for use, or to a second position parallel to the housing, in which the socket and the prongs are recessed in the central opening.

BRIEF DESCRIPTION OF SEVERAL VIEWS OF THE DRAWINGS

FIG. 6 is a side elevational view of an alternative embodiment of the surge protector according to the present invention with the electrical connector in its closed/nonuse position.

FIG. 7 is a front elevational view of one surface of an alternative embodiment of the surge protector according to the present invention with the electrical connector in its closed/nonuse position.

DETAILED DESCRIPTION OF THE INVENTION

Figures 1, 2:
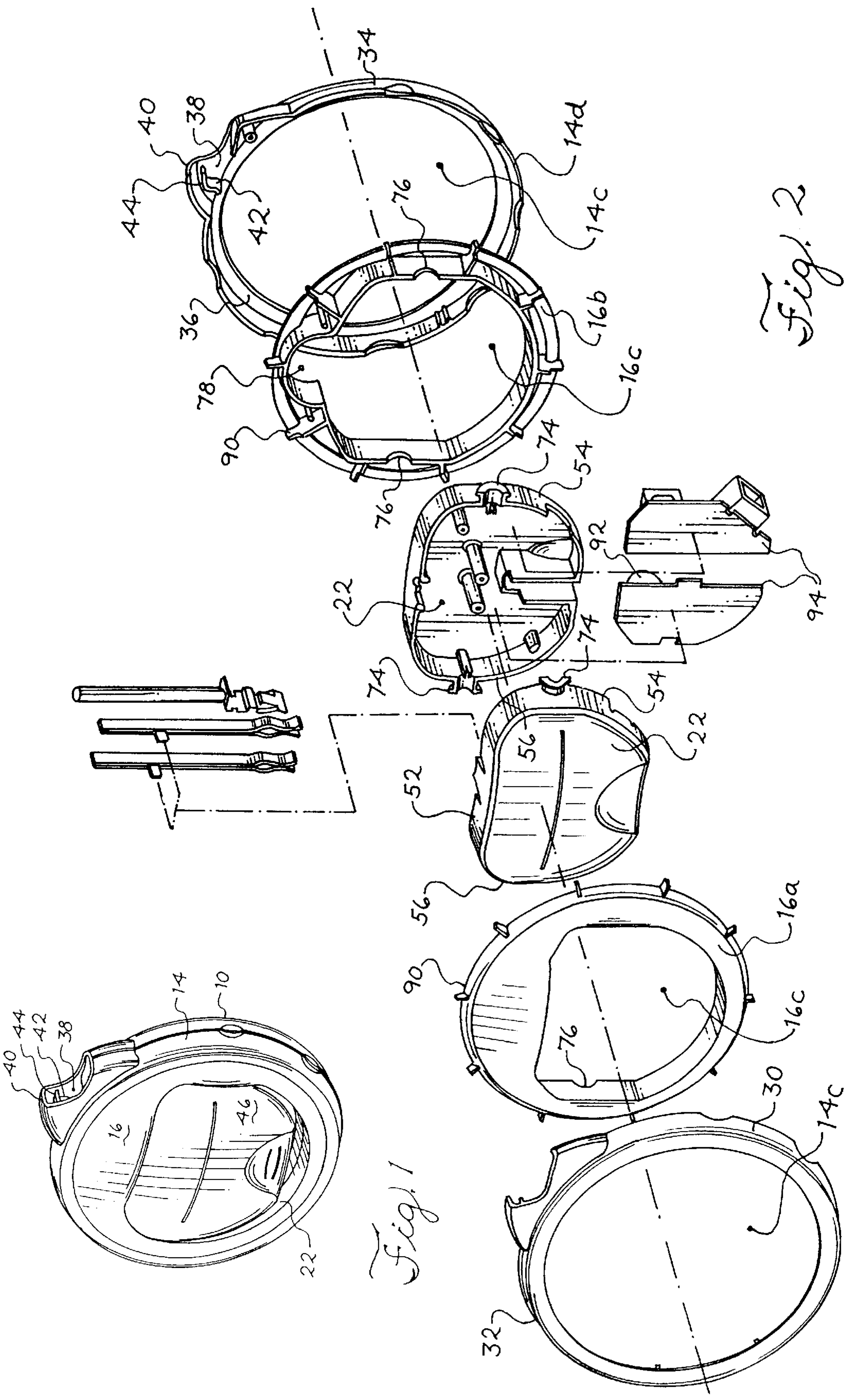
FIG. 1 is an exploded perspective view of the preferred embodiment of the surge protector according to the present invention.
FIG. 2 is a perspective view of the preferred embodiment of surge protector according to the present invention.
Figure 3:
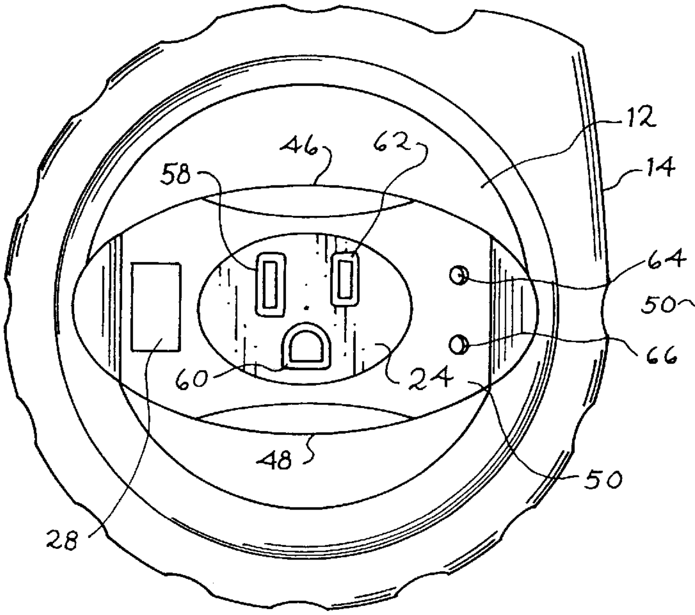
FIG. 3 is a front elevational view of an alternative embodiment of the surge protector according to the present invention with the electrical connector in its open/use position.

While the invention is susceptible to various modifications and alternative forms, a specific embodiment thereof has been shown by way of example in the drawings and will be described in detail. It should be understood, however, that it is not intended to limit the invention to the particular form described, but, on the contrary, the intention is to cover all modifications, equivalents, and alternatives falling within the spirit and scope of the invention as defined by the appended claims.

The portable surge protector of the present invention has a main housing 10. Preferably, the housing is generally toroidal in shape. It is to be understood, however, that the housing can have any suitable shape dictated by, among other things, manufacturing or consumer considerations. Referring to the drawings FIGS. 1–7, a portable surge protector of the present invention has a main housing 10 having a central opening 12. The housing includes an outer housing ring 14 and a mounting reel 16 which define an interior cavity 18 for storing a cord 20. In a preferred embodiment, the cord 20 is a data or telephone line cord. It is contemplated, however, that the cord 20 may be any flexible cord that can be used to transport electricity, data, light, or the like. An electrical connector 22 having at least one electrical socket 24, an electrical plug 26, and a port 28 is pivotally mounted within the central opening 12 of the main housing 10.

The surge protector is portable and preferably formed of plastic molded material so as to be lightweight and inexpensive. The outer ring housing 14, mounting reel 16, and electrical connector 22 are preferably made from a nonconductive, high impact thermoplastic material, such as ABS, acetal or polyvinyl chloride (PVC), and are constructed by a conventional manufacturing process such as injection molding.

As shown in FIG. 1, the outer housing ring 14 is a generally circular ring consisting of a front piece 14*a* and a back piece 14*b* that are joined to form outer housing ring 14. When the front and back pieces of the outer housing ring 14 are joined to form the outer housing ring 14, the outer housing ring 14 has a central opening 14*c,* a top surface 30 and two dependent side surfaces 32, 34 and an annular interior cavity 18. The side surfaces 32, 34 have channels 36 on the inside periphery of the side surfaces 32, 34. The outer housing ring 14 includes an aperture 38 to the interior cavity 18 located on the exterior periphery of the outer housing ring 14 from which the cord 20 exits the outer housing ring 14. Preferably, an aperture hood 40 is positioned over the aperture 38. In a preferred embodiment, a cord guide 42 and a catch mechanism 44 are located within the aperture hood 40.

The mounting reel 16 is a generally circular ring having a central opening 16*c* and is rotatably disposed within the inner periphery of outer housing ring 14. The mounting reel 16 consists of a front mounting reel piece 16*a* and a back mounting reel piece 16*b* which, when joined together, form the mounting reel 16. The mounting reel 16 has multiple spaced apart mounting reel receiving guides 90 to rotatably secure the mounting reel 16 to the outer housing ring 14. The receiving guides 90 extend into the channels 36 to secure the mounting reel 16 and allow the reel 16 to rotate without significant lateral movement.

The electrical connector 22 has with two lateral sides (46, 48), first and second exterior faces (50, 52), and first and second mounting sides (54, 56). The first exterior face 50 may be beveled, straight or curved. Preferably, the shape conforms to the interior of the mounting reel 16 to form a nonobtrusive profile. The electrical connector 22 has socket receptacles 58, 60, 62 of socket 24 generally centrally located on the first exterior face 50 that are arranged to receive the prongs of an electrical plug (not shown). Electrical socket receptacles 58, 60, 62 include a line prong receptacle 58, a neutral prong receptacle 60 and a ground prong receptacle 62 formed in the face of the socket. Electrical socket receptacles 58, 60, 62 extend completely into the interior space of the electrical connector, and are oriented to receive an electrical plug (not shown).

Adjacent the socket 24, though not necessarily immediately adjacent, is at least one port 28 that is preferably adapted to receive a data or telephone line. It is contemplated, however, that the port 28 may be used to receive electricity, data, light, cable or the like. The port 28 is mounted in the first exterior face 50 of the electrical connector 16. In a preferred embodiment, the port 28 functions as an in-line data port that may be connected to a wall or floor mounted data or phone socket by a conventional phone cord having male data line jacks at both ends (not shown).

Preferably, one or more indicator lights 64, 66, such as LEDs, can be provided. Such lights can provide the user with an indication that the device is operable or there is some malfunction. When provided, the indicator lights are positioned near the socket on the electrical connector such that they are visible through a lens in the first exterior face 50 of the electrical connector 22. One or more LEDs 64, 66, such as a ground LED indicating that the socket into which the device is plugged is properly wired or that surge protection circuitry is functional, may be included on the first exterior face 50 of the electrical connector 22. In a preferred embodiment, as shown in FIG. 1, socket 24, data port 28, and LEDs 64, 66 are located on separate surfaces of a first exterior face.

An electrical plug 26 is provided in the electrical connector 16. The plug 26 has prongs 68, 70, 72 that extend from the second exterior face 52 of the electrical connector 22. The prongs 68, 70, 72 are oriented for insertion into a powered socket (not shown) and are adapted to deliver electricity to socket 24 mounted in the first exterior face 50 of the electrical connector 16.

Within the electrical connector 16 the prongs 68, 70, 72 operate as bus bars or contact strips 68*a,* 70*a,* 72*a* and include terminals formed at each end 68*b,* 70*b,* 72*b* for receiving the prongs from an electrical plug (not shown). For reference purposes, contact strips 68*a,* 70*a,* 72*a* are designated as a line contact strip 68*a,* a neutral contact strip 70*a,* and a ground contact strip 72*a.* A contact mounting mold (not shown) is integrally formed in the interior wall of the interior space of the electrical connector for supporting the contact strips and electrically isolating them from each other. When the contact strips are mounted in the electrical connector, their terminals are positioned adjacent the sockets receptacles, 58, 60, 62, respectively, of socket 24, so as to contact the prongs of a plug inserted into the socket (not shown). The contact strips 68*a,* 70*a,* 72*a* are electrically couple to the prongs of plug 26 for delivery of power to socket 24. In particular, line contact strip 68*a* is electrically coupled to line prong 68, neutral contact strip 70*a* is electrically coupled to neutral prong 70, and ground contact strip 72*a* is electrically coupled to ground prong 72. As shown in FIG. 2, a circuit board 92 is preferably mounted within the interior of the electrical connector 22. At least one surge protector 94 is associated with the circuit board 92.

Figure 4:
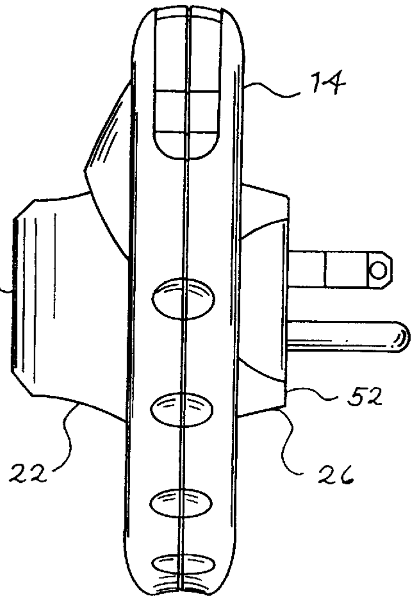
FIG. 4 is a side elevational view of an alternative embodiment of the surge protector according to the present invention with the electrical connector in its open/use position.
Figure 5:
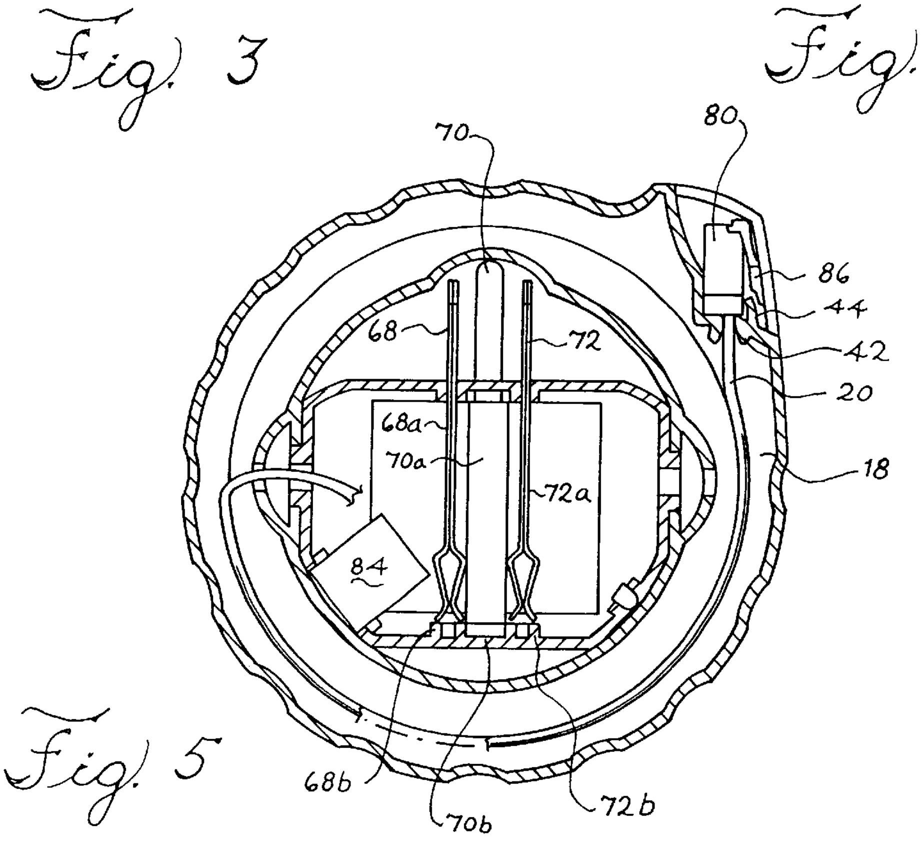
FIG. 5 is a front cross-sectional view of an alternative embodiment of the surge protector according to the present invention.

The electrical connector 22 is pivotally supported within the central opening 16*c* of the mounting reel 16. The electrical connector 22 is pivotally connected to the mounting reel 16 by engagement of one or more hollow trunnions 80 located on the first and second mounting sides 54, 56 of the electrical connector 22 with mounting reel apertures 76 in the mounting reel 16 and is movable between a first, open position shown in FIGS. 3 and 4, and a second, closed position shown in FIGS. 6 and 7. In the first or open position, prongs 68, 70, 72 are exposed and available for insertion into a powered socket. A recess 78, formed in the back component 16*b* of the mounting reel 16 is configured to receive the prongs 68, 70, 72 of the electrical plug 26 when the electrical connector 22 is in the second closed position. In a preferred embodiment, the electrical connector can be rotated approximately ninety degrees from a closed position with the plug 26 in recess 78 to an open position as shown in FIG. 4, enabling the electrical plug to be inserted into a floor or wall electrical socket while exposing the electrical socket for use away from the wall or floor socket to receive an electrical cord from an electrical device such as a portable personal computer.

The interior storage cavity 18 of the housing 10 is designed to receive and retain a cord 20 in a coiled arrangement around the mounting reel 16 within the interior storage cavity 18 of the housing 10. Preferably, the cord is a telephone or data line cord 20 having a male telephone connection plug 80 at its first end which passes through aperture 38 and over guide 42, for insertion into an external female telephone or data line connection socket (not shown). It is contemplated, however, that the cord may be any flexible cord that can be used to transport electricity, data, light, or the like.

The second end 82 of the cord 20 passes through one of the hollow trunnions 74 into the interior of the electrical connector 22. The second end 82 of the cord 20 is electronically coupled to a female connector 84 within the electrical connector 22 having a data port 28 on the exterior of the housing. Rotation of the mounting reel 16 in one direction, either by rotating the reel itself or the electrical connector, permits the cord to move between a non-use, coiled position within the interior storage cavity 18 of the housing 10 and a use, extended position outside of the main housing when the reel is rotated in the other direction.

In a preferred embodiment, the hood 40 has a catching mechanism 44 that is designed to catch and retain the tab 86 of male data or phone line jack 80 of the cord 20, to hold the jack when the cord 20 is not extended and to prevent the jack 80 from being reeled into the interior cavity 18 of the main housing 10 along with the cord 20.

In operation, the electrical connector 22 is rotated to a first position normal to the main housing 10 to expose the electrical socket 24 and plug 26 for use, and rotated to a second position parallel to the housing to store the 24 socket and plug 26. Cord 20 is released from its coiled position in the interior of the 10 by either manually pulling cord 20 through the aperture 38 and over guide 42 or rotating the electrical connector 16 and the mounting reel 16 in unison until cord 20 is extended to its desired length. When storage is desired, cord 20 may be retracted by manually turning either the electrical connector 16 or the mounting reel 14 in the direction opposite from that used to release cord 20 until the cord 20 is fully retracted and tab 86 of data line plug 80 has been caught on the catch mechanism 44 in the hood 40.

While the preferred embodiment shows manual rotation to retract the cord, an alternative embodiment could include an automatically retractable cord.

Of course, it should be understood that a wide range of changes and modifications can be made to the preferred embodiment described above. It is therefore intended that the foregoing description illustrates rather than limits this invention, and that it is the following claims, including all equivalents that define this invention.

What is claimed is:

1. A device for connection to an electrical socket comprising:

a. a housing having a central opening;

b. an internal cavity surrounding the central opening and having a peripheral opening to receive a cord;

c. a surge protector;

d. mounting reel wherein the cord moves between a non-use, coiled position within the cavity of the housing and a use, extended position outside of the housing when the reel is rotated; and e. rotatable connector having at least one electrical socket, a set of electrical prongs extending rearwardly from the electrical socket, a mount for the connector to pivotally support the connector in the central opening wherein the connector can be rotated to a first position normal to the housing in which the at least one socket and prongs are exposed for use and can be rotated to a second position parallel to the housing.

2. The device of claim 1 wherein the mounting reel is rotatably secured within the housing.

3. The device of claim 2 wherein the mounting reel is rotatably secured within the housing by a plurality of spaced apart mounting reel guides on the outer periphery of the mounting reel.

4. The device of claim 1 wherein the housing comprises an outer housing ring.

5. The device of claim 4 wherein the outer housing ring comprises an inner top surface and two sides depending from the inner top surface.

6. The device of claim 5 wherein the internal cavity of the housing is defined by the inner top surface of the outer housing ring, the two dependent sides of the outer housing ring, and the outer periphery of the mounting reel.

7. The device of claim 6 wherein the sides of the outer housing ring define internal channels to receive the mounting reel.

8. The device of claim 7 wherein the mounting reel has a plurality of spaced apart mounting reel guides extending into the internal channels to rotatably secure the mounting reel within the outer ring.

9. The device of claim 1 wherein the rotatable connector comprises a pair of trunnions.

10. The device of claim 9 wherein the mounting reel has two peripheral openings adapted to receive the trunnions.

11. The device of claim 10 wherein the trunnions extend through the peripheral openings in the mounting reel.

12. The device of claim 9 wherein the trunnions are hollow.

13. The device of claim 12 wherein at least one of the trunnions receives the second end of the cord.

14. The device of claim 1 wherein the rotatable connector has at least one port.

15. The device of claim 1 wherein further comprising two electrical sockets.

16. A device for connection to an electrical socket comprising:

a. a housing having a central opening;

b. an internal cavity surrounding the central opening and having a peripheral opening to receive a cord;

c. a surge protector;

d. a mounting reel secured within the internal cavity wherein the cord moves between a non-use, coiled position within the cavity of the housing and a use, extended position outside of the housing when the reel is rotated; and e. a rotatable connector mounted to the mounting reel by trunnions extending into holes in the mounting reel and having at least one electrical socket, a set of electrical prongs extending rearwardly from the electrical socket, a mount for the connector to pivotally support the connector in the central opening wherein the connector can be rotated to a first position normal to the housing in which the at least one socket and prongs are exposed for use and can be rotated to a second position parallel to the housing.

17. The device of claim 16 wherein the mounting reel is rotatably secured within the housing by a plurality of spaced apart mounting reel guides on the outer periphery of the mounting reel.

18. The device of claim 17 wherein the housing comprises an outer housing ring.

* * * * *